Aug. 15, 1967   W. J. DZAACK   3,336,064
LIQUID ANTI-FREEZE DISPENSING FRACTION INCREASING DEVICE
Filed July 27, 1965
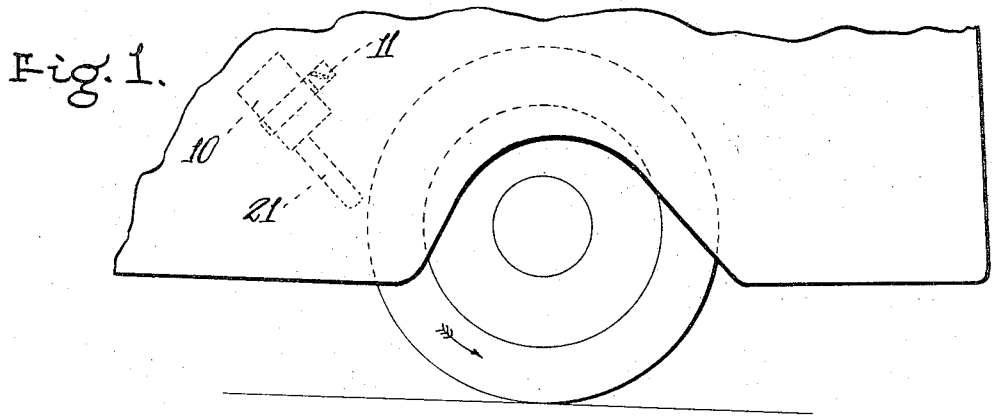
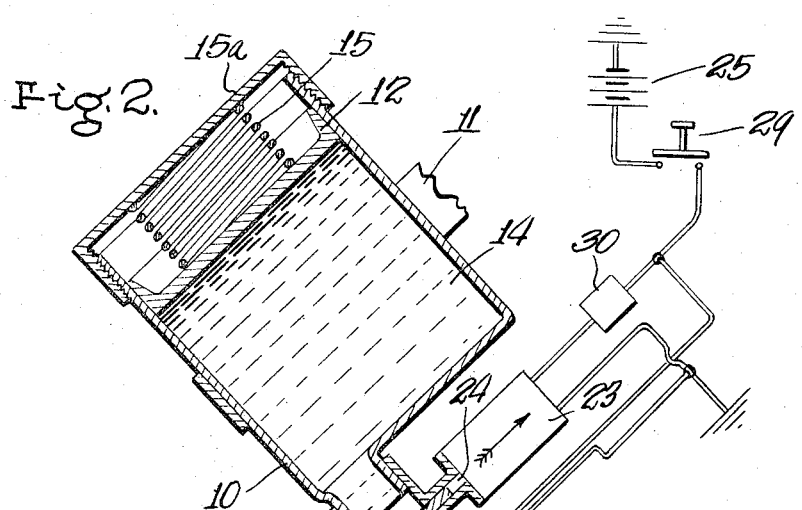
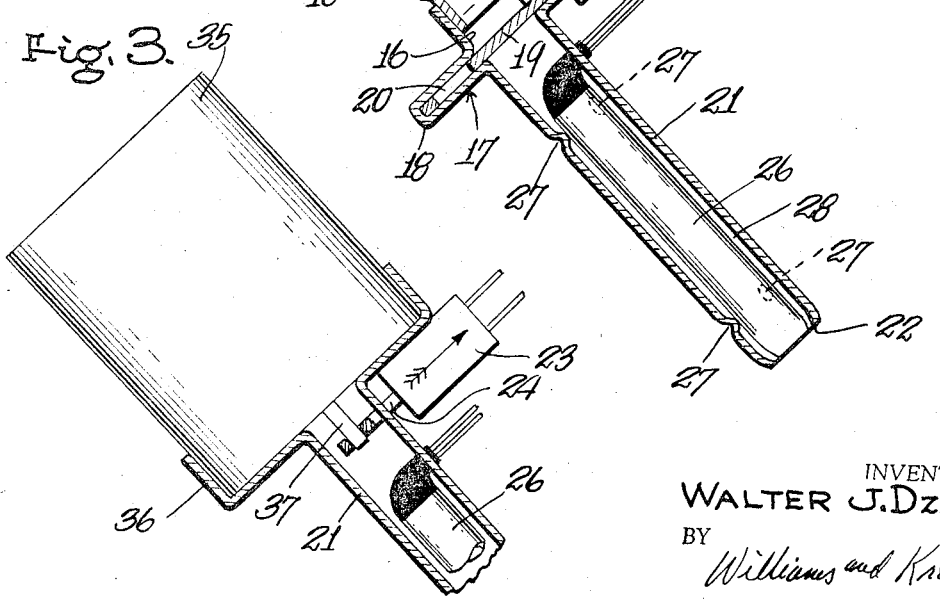
INVENTOR.
WALTER J. DZAACK
BY
*Williams and Kreske*
ATTORNEYS when current (such as from the automobile battery 25) is caused to flow through the coils of the solenoid, the core 24 is drawn in the direction of the arrow to register the opening 20 with the outlet 16.

In order to heat the anti-freeze solution as it passes through the outlet conduit 21, an electrical heating element 26 is disposed within such conduit and is held centered by a series of dimples 27 struck inwardly from the conduit. Thus, a small annular space 28 (somewhat exaggerated in FIGURE 2) provides passage of the anti-freeze solution in close contact with the sheath of the heating element to pick up heat therefrom.

A hand switch 29 may be disposed within reach of the operator of the automobile and is operable to effect energization of the solenoid 23 and heating element 26. Since the heating element may take a very short time to heat to full capacity, it is preferable to include a time delay 30 in the circuit between the switch 29 and solenoid 23 so that the latter is energized seconds after the energization of the heating element.

As seen in FIGURE 1, the outlet 22 is disposed as to direct heated anti-freeze solution onto a portion of the tire just prior to its engagement with the icy road (assuming the tire is rotating in the direction of the arrow). This heated solution will be carried by the tire into contact with the icy surface and thereby greatly improve traction.

FIGURE 3 discloses another embodiment of my invention wherein the anti-freeze solution is contained within an Aerosol can 35 which is removably carried within a cup-shaped support 36 carried by the automobile. The cup-shaped support communicates with the outlet conduit 21 as shown, and the electric heating element is disposed within the conduit as before and it and the solenoid 23 may have electrical connections with the battery, switch and time delay as previously described.

In the embodiment of FIGURE 3, the core 24 of the solenoid is connected to the outlet nipple 37 of the Aerosol can 35 so as to tilt this nipple when the solenoid coil is energized and thus cause flow of anti-freeze solution under pressure from the can and through the outlet conduit 21.

When the contents of the Aerosol can is depleted, another can may be connected into position in the cup-shaped support 36. A supply of Aerosol cans 35 may be kept on hand and a can may be carried by a person walking on an icy surface, the nipple 37 being manipulated by a finger of the person and directed to apply unheated anti-freeze solution to an icy spot.

In view of the foregoing it will be apparent to those skilled in the art that I have accomplished at least the principal object of my invention and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

Traction improving apparatus for a wheeled automotive- vehicle, comprising a container containing anti-freeze solution, said container having an outlet for delivering solution from said container to the road-engaging surface of a drive wheel of said vehicle, a valve for controlling flow of solution through said container outlet, an electric heating element for heating said solution, an electric motor member for operating said valve, a switch in electric circuit with the storage battery of said vehicle and said heating element and said motor member, said switch being operably to permit or interrupt flow of current from said battery to said heating element and said motor member, and a time delay device for delaying operation of said motor member when said switch is in current permitting position so that said valve is opened a predetermined time after said heating element is energized.

References Cited

UNITED STATES PATENTS

| | | | |
|---|---|---|---|
| 494,080 | 3/1893 | Pinkham | 291—20 |
| 1,204,665 | 11/1916 | Jones et al. | 291—20 |
| 1,480,393 | 1/1924 | Johns | 291—20 |
| 1,560,256 | 11/1925 | Johns | 291—20 |
| 1,734,277 | 11/1929 | Skolnik et al. | 291—20 |
| 1,824,815 | 9/1931 | Fuchs | 291—1 |
| 1,883,409 | 10/1932 | Roy | 291—3 X |
| 2,684,123 | 7/1954 | Mattis | 180—1 |
| 2,832,619 | 4/1958 | Davis | 291—1 |
| 2,933,337 | 4/1960 | Katz | 291—1 |
| 2,971,793 | 2/1961 | Peterson et al. | 291—1 |
| 3,256,920 | 6/1966 | Byers | 152—208 |

FOREIGN PATENTS

| | | |
|---|---|---|
| 563,528 | 11/1932 | Germany. |
| 571,618 | 3/1933 | Germany. |

ARTHUR L. LA POINT, *Primary Examiner.*

H. BELTRAN, B. FAUST, *Assistant Examiners.*